United States Patent
Ikegami

(10) Patent No.: US 6,413,438 B1
(45) Date of Patent: Jul. 2, 2002

(54) METHOD OF FORMING VIA HOLE BY DRY ETCHING

(75) Inventor: Naokatsu Ikegami, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/477,817

(22) Filed: Jan. 5, 2000

(30) Foreign Application Priority Data

Sep. 9, 1999 (JP) ............................................. 11-255867

(51) Int. Cl.$^7$ ............................................. C03C 15/00
(52) U.S. Cl. ............................ 216/67; 216/80; 438/723; 438/737; 438/743
(58) Field of Search .............................. 216/39, 67, 80; 438/723, 737, 743; 252/79.1

(56) References Cited

U.S. PATENT DOCUMENTS

| | | | |
|---|---|---|---|
| 5,219,792 A | | 6/1993 | Kim et al. .................... 437/195 |
| 5,413,963 A | | 5/1995 | Yen et al. .................... 437/195 |
| 5,830,807 A | * | 11/1998 | Matsunaga et al. .......... 438/714 |
| 5,849,637 A | | 12/1998 | Wang .......................... 438/699 |
| 5,861,345 A | * | 1/1999 | Chou et al. .................. 438/763 |
| 6,010,946 A | * | 1/2000 | Hisamune et al. ........... 438/405 |
| 6,014,979 A | * | 1/2000 | Van Autryve et al. ....... 134/1.1 |
| 6,117,793 A | * | 9/2000 | Tang .......................... 438/740 |
| 6,123,862 A | * | 9/2000 | Donohoe et al. ............. 216/17 |
| 2001/0000246 A1 | * | 4/2001 | Tang et al. .................. 438/689 |

FOREIGN PATENT DOCUMENTS

JP      06-029400      2/1994   ......... H01L/21/302

* cited by examiner

Primary Examiner—Frankie L. Stinson
Assistant Examiner—Alvan Olsen
(74) Attorney, Agent, or Firm—Volentine Francos, PLLC

(57) ABSTRACT

When a via hole is formed in an insulating film formed by stacking a TEOS oxide film over an organic SOG film whose surface is modified as a low-K interlayer dielectric, by dry etching, a mixed gas of CHF3, CH2F2 and CO is used as an etching gas and a mixture ratio between CH2F2 and (CHF3+CH2F2) is set to 50% or more, whereby the dry etching for the formation of the via hole is performed.

3 Claims, 3 Drawing Sheets

$CH_2F_2/(CHF_3 + CH_2F_2)=0\%$ $CH_2F_2/(CHF_3 + CH_2F_2)=17\%$ $CH_2F_2/(CHF_3 + CH_2F_2)=33\%$ $CH_2F_2/(CHF_3 + CH_2F_2)=50\%$ $CH_2F_2/(CHF_3 + CH_2F_2)=66\%$

METHOD OF FORMING VIA HOLE BY DRY ETCHING

BACKGROUND OF THE INVENTION

1. Field of the Invention

This invention relates to a method of forming a via hole in a semiconductor integrated circuit element by dry etching, and particularly to a method of forming a via hole by dry etching an organic SOG; film having low-K (low dielectric constant) as an interlayer dielectric.

2. Description of the Related Art

"Wiring widths and wiring intervals have been so narrowed with high integration of a semiconductor integrated circuit. Wiring lengths are also becoming so long. As a result, the resistance of each wire or interconnection and the capacitance between adjacent interconnections are on the increase, and increases in wiring delay and power consumption due to these have become a main focus. As one method of lessening the influence exerted on device performance with such high integration, a method of bringing an insulating film formed between interconnections into low-K has been studied and developed."

As materials each having low-K, may be mentioned an FSG film in which fluorine is contained in an oxide film ($SiO_2$), an organic SOG (Spin On Glass) film, an organic insulating film or a porous film, etc.

A via hole has heretofore been formed by a dry etching technique after a CVD oxide film, an organic SOG film corresponding to a low-K film, and a capping oxide film have been deposited over a lower layer interconnection as interlayer dielectrics. An oxygen plasma treatment process for modifying the surface of the organic SOG film is carried out to prevent film peeling developed between the capping oxide film and the organic SOG film. As the organic SOG film, for example, one is used wherein a low-K material composed of an oxide film ($SiO_2$) added with an alkyl group us is dissolved in an organic solvent.

Further, an upper layer interconnection is formed and electrically connected to the lower layer interconnection through each via hole. Dry etching is performed under a pressure of a few Pa through; the use of a mixed gas of $C_4F_8$, $O_2$ and Ar corresponding to a general etching condition for an oxide film by, for example, parallel plate magnetron reactive ion etching (RIE) equipment.

"However, a problem arises in that when a low-K film such as an organic SOG film is introduced into a device, a side-etching called "bowing" would be easily formed at an interface between a capping oxide film 3 and an organic SOG film 2 during forming a via hole 5 by etching as shown in FIG. 1. In FIG. 1, a lower level interconnect 1 for example is exposed through via hole 5, and a CVD oxide film 4 is included as formed on capping oxide 3."

The side-etching occurs during via hole etching. Because the etching is easily done in the transverse direction upon dry etching for the formation of the via hole since the interface between the capping oxide and the SOG film becomes a very porous film due to the oxygen plasma treatment process or the like for modifying the surface of the organic SOG film. Further, this results from the existence of oblique incident ions at dry etching.

The shape of the bowing has raised problems such as corrosion developed by the reaction between the tungsten and organic SOG, peeling of a tungsten film, the occurrence of a cavity in the via hole, etc. when the tungsten film is embedded in the via hole.

SUMMARY OF THE INVENTION

An object of the present invention is to form a via hole satisfactory in shape without producing a side-etching called "bowing" developed upon dry etching for the formation of the via hole. Thus, when via hole is formed in an insulating film composed of an organic SOG film formed over an oxide film in laminated form by dry etching, the etching is executed in such a manner that a mixed gas of $CHF_3$, $CH_2F_2$ and CO is used as an etching gas and the flow rate of $CH_2F_2$ becomes greater than or equal to 50% of the flow rate of $CHF_3+CH_2F_2$. As a result, the problem on the bowing developed in the neighborhood of the interface between a capping oxide film and an organic SOG film can be prevented from arising. It is also possible to form a via hole stable in shape and high in reliability.

A typical one of inventions of the present application has been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE INVENTION

Figure 1:
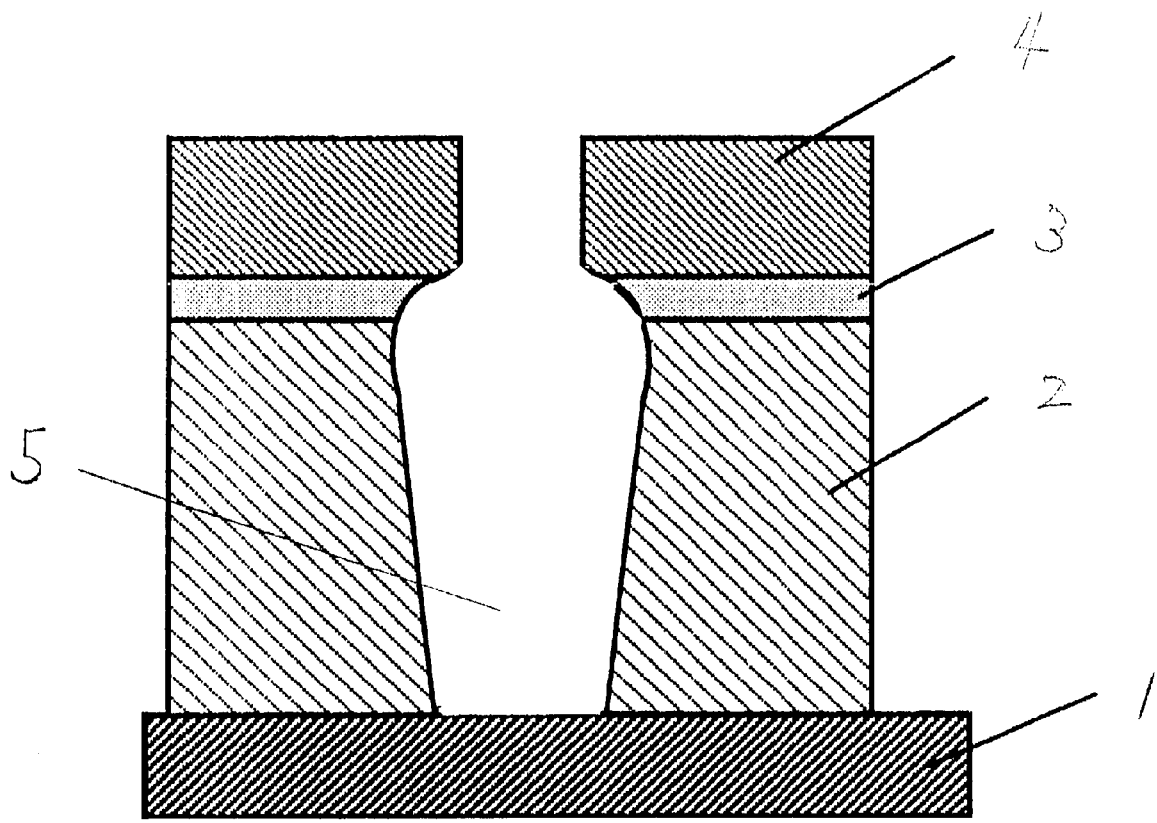
FIG. 1 is a diagram for describing a problem on the shape of a via hole formed by dry etching employed in a prior art.
Figure 2A:
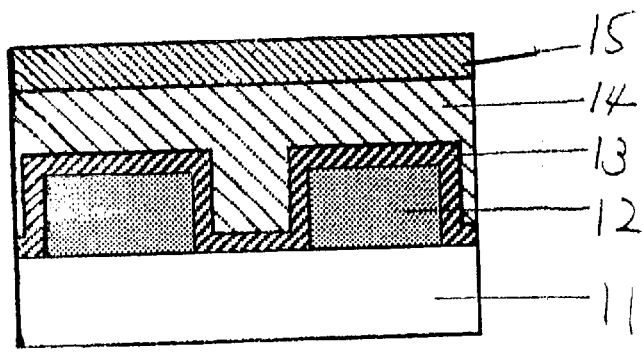
FIGS. 2A through 2C are respectively via hole dry-etching process diagrams for describing an embodiment of the present invention.

A process diagram for describing a first embodiment of the present invention is shown in FIG. 2. In FIG. 2A, a metal wire or interconnection used as a lower layer interconnection 12 is first formed over a silicon substrate 11. Thereafter, a plasma TEOS (tetraethoxysilane) oxide film 13 and an organic SOG film 14 each used as an interlayer dielectric are successively deposited over the metal interconnection. An oxygen plasma treatment process for modifying the surface of the organic SOG film 14 is effected to prevent film peeling developed between a capping oxide film 15 to be next formed and the organic SOG film 14. Further, a plasma TEOS oxide film used as the capping oxide film 15 is successively deposited over the organic SOG film 14.

Figure 2B:
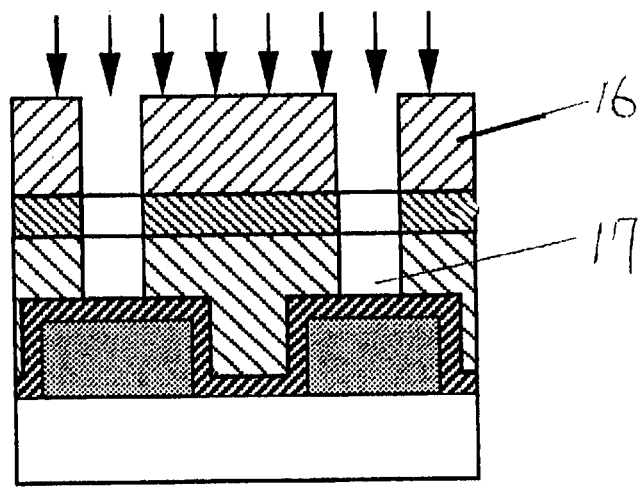

Next, resist pattern 16 for a via hole for providing continuity between an upper layer interconnection and the lower layer interconnection 12 are formed by the normal photolithography technology in FIG. 2B, whereby the via hole 17 is formed by dry etching. The dry etching for the formation of the via hole is carried out under the condition of a pressure of 5.2Pa using a mixed gas of $CHF_3$, $CH_2F_2$ and CO by the parallel plate magnetron reactive ion etching equipment.

Figure 2C:
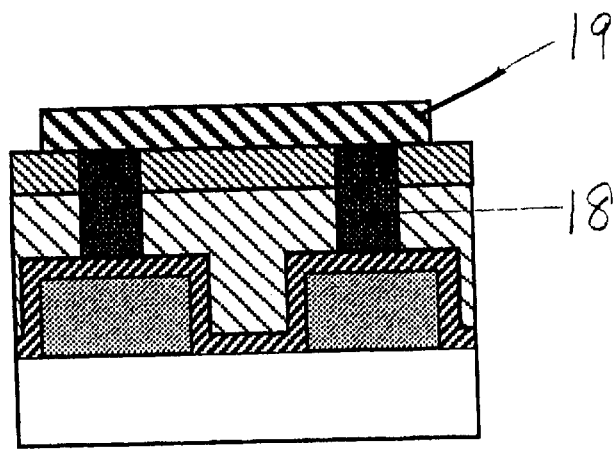
Figure 3A:
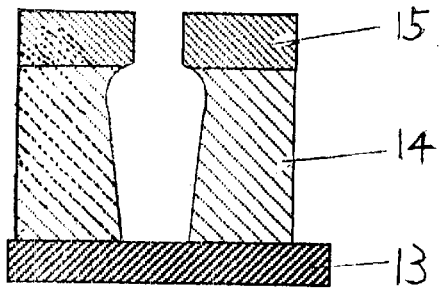
FIGS. 3A through 3E are respectively explanatory diagrams illustrating changes in the shape of a via hole at the time that a gas flow rate for dry etching is changed.
Figure 3B:
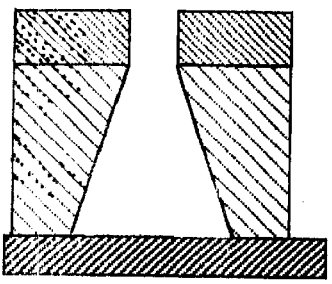
Figure 3C:
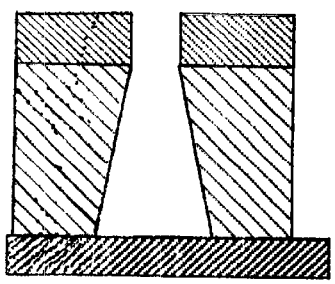
Figure 3D:
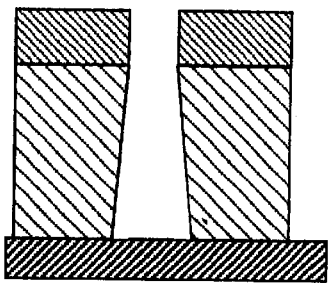
Figure 3E:
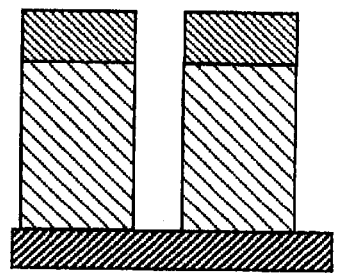

In FIG. 2C, the resists 16 are removed by $O_2$ plasma treatment. Further, tungsten is deposited over the entire surface of the silicon substrate 11 and flattened by a CMP method to thereby selectively form buried interconnections used as tungsten plugs 18 in their corresponding a via hole 17. Finally, each upper layer metal interconnection is formed by patterning to cause the upper layer interconnection 19 and the lower layer interconnection 12 to conduct.

FIG. 3 shows changes in the shape of the organic SOG film 14 and the plasma TEOS oxide film 15 used as the capping oxide film with respect to each via hole where the flow rate of a mixed gas of CHF3, CH2F2 and CO is kept constant as in the case of CHF3+CH2F2=30 sccm and CO=170 sccm and a mixture ratio between CHF3 and CH2F2 is changed. It is understood from FIG. 3 that the shape of the organic SOG film 14 gradually approaches from an inversely-tapered shape to a vertical shape as the proportion of CH2F2 increases. Each via hole can be made substantially vertical by setting a mixture ratio between CH2F2 and (CHF3+CH2F2) to 50% or more in particular.

Since the mixed gas of CHF3, CH2F2 and CO is used as the etching gas and the mixture ratio between CH2F2 and (CHF3+CH2F2) is set to 50% or more as described above to thereby form the via hole by dry etching, it is possible to prevent the occurrence of bowing which has heretofore been developed in the interface between the plasma TEOS oxide film and organic SOG film at each via hole. As a result, the via hole can be stabilized in shape and the subsequent embedding of a tungsten film or the like in the via hole can be executed with satisfactory reliability.

While the present invention has been described with reference to the illustrative embodiment, this description is not intended to be construed in a limiting sense. Various modifications of the illustrative embodiment will be apparent to those skilled in the art on Preference to this description. It is therefore contemplated that the appended claims will cover any such modifications or embodiments as fall within the true scope of the invention.

What is claimed is:

1. A dry etching method comprising:

forming an organic SOG film;

reforming a surface of the organic SOG film by an oxygen plasma process;

forming a TEOS oxide film on the reformed surface of the organic SOG film; and etching the TEOS oxide film to form a contact hole by using a mixed gas of CHF3, CH2F2 and CO, wherein a flow rate of CH2F2 is 50% or more of a flow rate of CHF3 and CH2F2.

2. The dry etching method according to claim 1, wherein the TEOS oxide film is formed by plasma.

3. The dry etching method according to claim 1, wherein the organic SOG film is formed by adding an alkyl group to an oxide of silicon.

* * * * *